United States Patent [19]

Kobayashi et al.

[11] E Re. 31,094

[45] Reissued Nov. 30, 1982

[54] APPARATUS FOR CONTROLLING HEATING TIME UTILIZING HUMIDITY SENSING

[75] Inventors: Tetsu Kobayashi, Nara, Japan; Takato Kanazawa, deceased, late of Nara, Japan, by Kyoko Kanayawa, administrator; Makoto Tsuboi, Yamatokoriyama, Japan

[73] Assignee: Matsushita Electrical Industrial Co., Ltd., Osaka, Japan

[21] Appl. No.: 162,774

[22] Filed: Jun. 25, 1980

Related U.S. Patent Documents

Reissue of:

[64] Patent No.: 4,097,707
Issued: Jun. 27, 1978
Appl. No.: 687,303
Filed: May 17, 1976

[30] Foreign Application Priority Data

May 20, 1975 [JP] Japan ..... 50-60751
May 20, 1975 [JP] Japan ..... 50-60752
Nov. 17, 1975 [JP] Japan ..... 50-138327

[51] Int. Cl.[3] ..... H05B 6/68

[52] U.S. Cl. ..... 219/10.55 B; 219/10.55 R; 99/325

[58] Field of Search ..... 219/10.55 B, 10.55 M, 219/10.55 R, 10.55 E; 426/243, 241, 523, 521; 99/468, 486, 451, 325, 327, DIG. 14; 34/50

[56] References Cited

U.S. PATENT DOCUMENTS

| | | | |
|---|---|---|---|
| 3,813,918 | 6/1974 | Moe | 219/10.55 R |
| 3,839,616 | 10/1974 | Risman | 219/10.55 R |
| 3,909,598 | 9/1975 | Collins et al. | 219/10.55 R |
| 3,932,723 | 1/1976 | Tamano et al. | 219/10.55 M |

*Primary Examiner*—B. A. Reynolds
*Assistant Examiner*—Philip H. Leung
*Attorney, Agent, or Firm*—Stevens, Davis, Miller & Mosher

[57] ABSTRACT

Apparatus for controlling heating time for food placed in a cooking apparatus such as a microwave oven in which heating time required for the humidity of the food which varies with the heating of the food to reach a representative humidity value after abrupt change with a positive gradient is measured, and the product of the measured heating time multiplied by a predetermined heating time coefficient which is inherent in the particular food is added to the measured heating time so that the sum represents the total required heating time for the food.

6 Claims, 9 Drawing Figures

NOTES: 1. A,B,C, AND D INPUTS ARE FREE TO CHANGE AFTER LOAD INPUT IS DISABLED.

2. WHEN COUNTING "UP", THE "DOWN" CLOCK MUST BE IN THE LOGICAL 1 STATE, AND CONVERSELY.

APPARATUS FOR CONTROLLING HEATING TIME UTILIZING HUMIDITY SENSING

Matter enclosed in heavy brackets [ ] appears in the original patent but forms no part of this reissue specification; matter printed in italics indicates the additions made by reissue.

The present invention relates to an apparatus for automatically controlling heating time for a food depending on the food to be heated in a cooking apparatus such as a microwave oven.

In microwave heating, the optimum heating time for a food to be heated is determined by various factors such as the initial temperature of the food to be heated, the volume of the food, the temperature to which the food is to be heated, the specific heat of the food and the microwave power to be supplied.

Heretofore, the heating time in the microwave oven has been determined by setting a standard heating time which was experimentarily determined depending on the type and volume of the food.

Such a heating time setting method however involved the disadvantage that no special attention was paid to other factors for determining the heating time such as the initial temperature of the food, the specific heat of the food, the destination temperature and the microwave power, and hence proper heating or cooking of the food was not attained. This is because a main factor that determines the finished state of the food is not the heating time but the temperature rise of the food to be heated per se.

Thus, if the temperature rise of the food being heating can be detected by some means, an optimum heating and cooking of the food will be attained, the finished state of which will not be influenced by the initial temperature of the food, the volume and the specific heat of the food and the microwave power supplied.

As a method for sensing the temperature rise of the food, it has been proposed to insert a temperature sensor directly into the food and to sense the temperature rise of the food by a non-contact temperature sensor. However, applications thereof are limited because the former method requires the direct contact of the temperature sensor with the food and the latter method cannot always provide accurate sensing of the temperature. On the other hand, it has been known to sense the temperature of the food or degree of heating by measuring the change of humidity which takes place as the food is heated. For example, in most foods, water included therein abruptly evaporates when the temperature of the food reaches 100° C. and a large amount of water vapor appears in the oven. By detecting such change of humidity by a humidity sensor, the time at which the humidity abruptly changes can be related to the time at which the food has reached 100° C.

The present invention makes use of such a relation between the food temperature and the humidity appearing thereat.

A method for detecting the humidity generated from the food to control the power of a magnetron is disclosed in U.S. Pat. No. 3,839,616 issued to Risman. This patent, however, uses a humidity sensor in order to periodically interrupt the heating of the food to prevent overheating of the food and does not provide automatic heating and cooking as in the present invention.

It is a first object of the present invention to eliminate the setting operation of heating time in an oven as represented by a microwave oven, which heating time is normally determined taking the volume of the food to be heated into consideration.

It is a second object of the present invention to eliminate the troublesome operation of taking a correction of the heating time into consideration, which correction is otherwise needed due to the variation of the initial temperature of the food.

It is a third object of the present invention to eliminate the troublesome operation of taking a correction of the heating time into consideration, which correction is otherwise needed due to the variation in the capacity of a thermal energy source such as a magnetron and the variation of the microwave absorption factor of the food.

It is a fourth object of the present invention to enable the detection of the temperature of the food under heating without requiring direct contact with the food.

It is a fifth object of the present invention to eliminate a timer setting operation for the reasons set forth in connection with the above objects.

It is a sixth object of the present invention to provide a function which enables external adjustment of the heating time so that a user can determine the heating time as he desires.

These and other objects, features and advantages of the present invention will become more apparent from the following description of the preferred embodiments of the invention when taken in conjunction with the accompanying drawings.

FIG. 1b is a generalized representation of FIG. 1a.

Figure 1A:
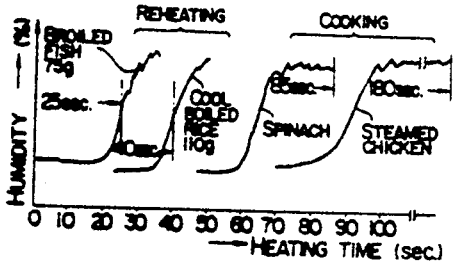
FIG. 1a illustrates examples of the change of humidity which occurs with the heating of the food in a microwave oven.

Referring to FIG. 1a, in microwave heating of the food, the change of humidity near the food being heating with the heating time generally rises abruptly, after the elapse of a certain period of time, with a different gradient than the previous one.

The time at which such abrupt change of gradient appears in reheating the food approximates the time at which the temperature of the food reaches an optimum temperature, and in many cases it approximates the reheating time which has been specified in a prior art microwave oven for the particular food according to experience.

It has been known from the experiment of heating and cooking of the food that a certain type of food must be further heated after the humidity has reached $H_1$, for a time period determined by the volume of the food to be heated and the particular cooking method therefor.

Since the time at which the humidity start to increase already includes the influence factors such as the amount of the food, the initial temperature of the food and the microwave power, there is no need for further taking the initial temperature and the volume into consideration when such humidity change is related to the temperature of the food and it is thus possible to automatically control the heating time.

Figure 1B:
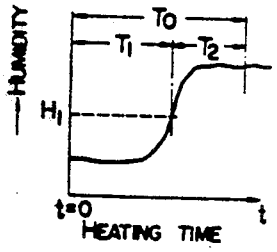

Referring now to FIG. 1b, the heating time $T_0$ for the food is generally given by the sum of a time $T_1$ required to reach a humidity value $H_1$ which represents an abrupt rise of the humidity and a time $T_2$ following $T_1$, which is determined by the volume of food and the type of cooking. That is;

$$T_0=T_1+T_2 \quad (1)$$

Since the time $T_2$ is determined by $T_1$ and the volume of the food and the type of cooking, it can be represented by;

$$T_2=kT_1 \quad (2)$$

where k is a coefficient inherent to the particular food. From the formulas (1) and (2), $$T_0=T_1+kT_1 \quad (3)$$

It is thus possible to determine the total required heating time by measuring the time $T_1$ required for the humidity to reach the appropriate value $H_1$ on the steep gradient and obtaining the sum of the time $T_1$ and the product of $T_1$ multiplied by the factor k which is determined by the type of the food and the type of cooking.

A process for determining the total required heating time can be realized, in principle, by the combination of humidity sensing means, a counter for counting the time $T_1$, a multiplier circuit for producing the product of $T_1 \times k$, a memory for the coefficient k for each type of cooking and a counter for counting the time $T_2$, and according to the present invention it can be accomplished by the following simple construction.

Assuming that the period of a clock signal is $\tau$ (frequency $1/\tau$) and n clock signals are counted in $T_1$ seconds, then $$T_1=\tau_n(\text{sec.}) \quad (4)$$

By putting the formula (4) to the formula (2), $$T_2=k\tau_n(\text{sec.}) \quad (5)$$

When an up-down counter is used to count the number n wherein counting of $T_1$ is effected in count-up mode while counting of $T_2$ is effected in count-down mode and the circuit is arranged such that the content of the counter after the counting in the count-down mode reaches zero at the time $T_0=T_1+T_2$, then the heating time $T_0$ can be counted only with the up-down counter.

When such a counting system is used, the content in the count-up mode and the content in the count-down mode are equal to each other. Therefore, in order to satisfy the relation of $T_2=kT_1$, the period of the clock signal in the count-down mode should be set to be k times as large as the period of the clock signal in the count-up mode, as seen from the formulas (4) and (5).

The frequency of the clock signal may be changed by changing circuit constants which determine the frequency of a clock signal generating circuit, such as a capacitance C or resistor R. In other words, the coefficient k which is inherent to the particular food to be heated can be related to the magnitude of the circuit constant C or R.

Figure 2A:
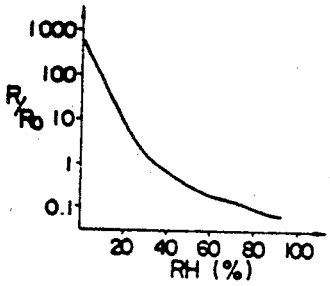
FIG. 2a shows a characteristic of a humidity sensor adapted to be used in the present invention.
Figure 2B:
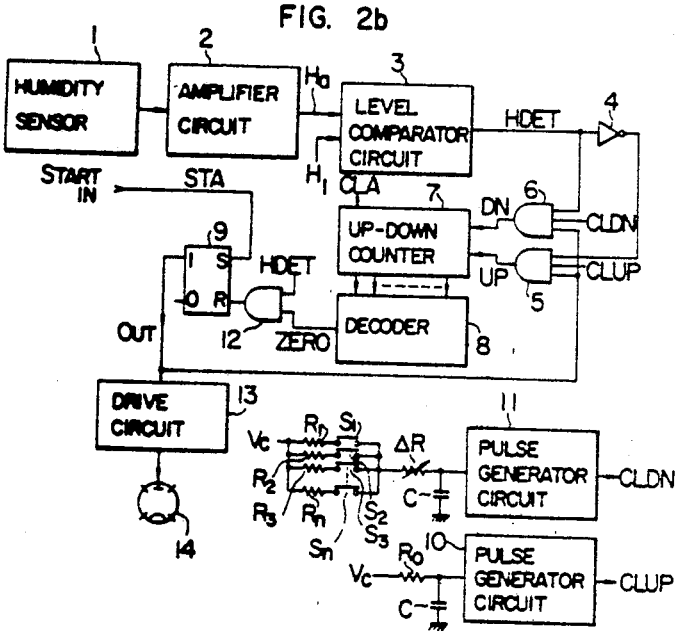
FIG. 2b shows a particular embodiment of the present invention.

A particular circuit configuration based on the above principle is shown in FIG. 2b.

In FIG. 2b, a humidity sensor 1 has a characteristic which exhibits a decrease of resistance with an increase of humidity as shown in FIG. 2a. The humidity sensor 1 is mounted at a suitable location in an oven to detect the humidity in the heating cavity. For example, the sensor may be located in the path of exhaust air flow from the heating cavity. As a typical example, a titanium oxide ($TiO_2$) ceramic humidity sensor has an excellent response, stability and reliability. An amplifier circuit 2 converts the change in the resistance of the humidity sensor 1 to a voltage and amplifies the same. A level comparator circuit 3 compares the output magnitude Ha of the amplifier circuit 2 with a preset reference magnitude $H_1$ and produces a binary signal of either high level i.e. a "1" signal or low level i.e. a "0" signal depending on the relation $Ha \geqq H_1$ or $Ha < H_1$. Reference numeral 4 designates an inverter circuit, and 5 and 6 designate three-input AND gates, the outputs of which are applied to an up-down counter 7 as counting input signals. The up-down counter 7 operates in the count-up mode when the output of the AND gate 5 is UP and in the count-down mode when the output of the AND gate 6 is DN (down). A CLA signal clears the contents of the counter.

The counter is a binary counter and the states of the respective bits are taken out. A decoder 8 receives the output signals for the respective bits of the counter 7 and the output ZERO thereof assumes the "1" state only when all of the bit output signals are "0".

A two-input AND gate 12 produces a "1" output only when both of the signals at HDET and ZERO outputs are in the "1" state.

Reference numeral 9 designates a flip-flop and the output signal OUT of which assumes the "1" state in response to a start signal STA and assumes the "0" state in response to the output signal from the AND gate 12.

The output signal OUT of the flip-flop 9 is applied to a drive circuit 13 for a magnetron 14. The CLA signal also clears the flip-flop 9 to render the output signal OUT to assume the "0" state.

Reference numerals 10 and 11 designate pulse generator circuits, the oscillation frequencies of which are varied with the magnitudes of resistors and capacitors. Typically they may be astable multivibrators.

Switches $S_1$, $S_2$, $S_3$ . . . $S_n$ are food group selection switches which select a desired resistor which is one of the parameters to determine the pulse period, in order to relate the coefficient k determined by the particular food to the period of the clock pulse as described above. The operation of the circuit will now be described with reference to FIGS. 1 and 2.

The CLA signal clears the flip-flop 9 and the counter 7. This may be effected by a circuit arrangement which automatically produces the CLA signal upon the power being turned on, although such a circuit is not a part of the present invention.

The selection switches $S_1$, $S_2$, $S_3$ . . . $S_n$ select one of the clock pulses CLDN having a period which is k times as large as the period T of the clock pulse CLUP produced by the pulse generator circuit 10. In other words, the selection switches select one item of food to be cooked. After the item of food has been selected, a heating start switch is depressed so that a start signal STA is developed to set the flip-flop 9. Thus, the output signal OUT assumes the "1" state. When this occurs, the drive circuit 13 powers the magnetron 14 so that the food is subjected to the heating condition.

On the other hand, the output HDET of the level comparator remains "0" until Ha reaches $H_1$ and the output HDETN of the inverter 4 remains "1". Since the OUT signal is "1", the AND gate 5 opens so that the clock pulses CLUP are applied to the up-down counter as the count-up input signal UP. Thus the pulses CLUP are serially counted up.

As heating proceeds, humidity increases. When the input signal Ha of the level comparator circuit 3 reaches $H_1$, the HDET assumes the "1" state and the HDETN assumes the "0" state. At the same time, the AND gate 5 is closed and the count-up input signal UP ceases, and the AND gate 6 is opened so that the clock pulses CLDN are applied to the counter 7 as the count-down input signal DN. Thus, the contents of the counter 7 are counted up until the time at which $H_1$ is reached and are thereafter counted down by the pulses CLDN. The period of the pulses CLDN is selected by the selection switches and it corresponds to k.

The contents of the counter 7 are applied to the decoder 8 which monitors the "0" content of the counter 7. As the contents of the counter are counted up until the time $T_1$ and are thereafter counted down, the contents of the counter 7 reach "0" when the time $kT_1=T_2$, which is determined by the period of the clock pulses CLDN, has elapsed. At this time, the output ZERO of the decoder 8 is in the "1" state. On the other hand, after the time $T_1$, the HDET is at the "1" state. Thus, the AND gate 12 is actuated and the flip-flop 9 is reset. That is, the output OUT is inverted to the "0" state so that the drive circuit 13 ceases to supply power to the magnetron resulting in a cessation of heating. Accordingly, by merely depressing one of the cook item selection switches, the user can heat the food automatically for an appropriate heating time $(T_1+kT_1)$ without using a timer.

Figure 3A:
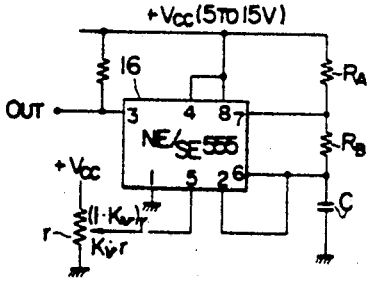
FIG. 3a shows an example of a circuit of a pulse generator capable of controlling a pulse period thereof, constructed in a standard integrated circuit.

However, the palate of human beings differs from person to person and the cooked state of the food heated in the above automatic heating system is an average. If the heating time can be externally controlled within an appropriate range in the above automatic heating system depending on the requirements of individuals, more satisfactory heating will be obtained. Thus, in the formula (3), $T_1$ is determined by the humidity. If k can be varied in the range of $\pm\Delta k$ around the center value $k_0$, then the total heating time $T_0$ is represented by:

$$\begin{aligned} T_0 &= T_1 + kT_1 \\ &= T_1 + (k_o \pm \Delta k)T_1 \\ &= T_1 + k_oT_1 \pm \Delta kT_1 \end{aligned} \tag{6}$$

where $k \cong k_0 \pm \Delta k$. Thus, the total heating time can be adjusted by the amount $\pm\Delta kT_1$. The coefficient k corresponds to the period of the clock pulses CLDN, which in turn corresponds to the magnitude of the resistance which is the parameter for the period. Therefore, by changing the resistance corresponding to the coefficient k to assume $R_0 \pm \Delta R$, the formula (6) can be satisfied. FIG. 3 shows an embodiment of such a clock pulse generator. In FIG. 3a, a period $\tau_p$ of the pulses generated is given by the following formula:

$$\tau_p = 0.7(R_A + 2R_B)k \tag{7}$$

where $$k = k_o r (0 \leqq k_y \leqq 1) \tag{8}$$

Figure 3B:
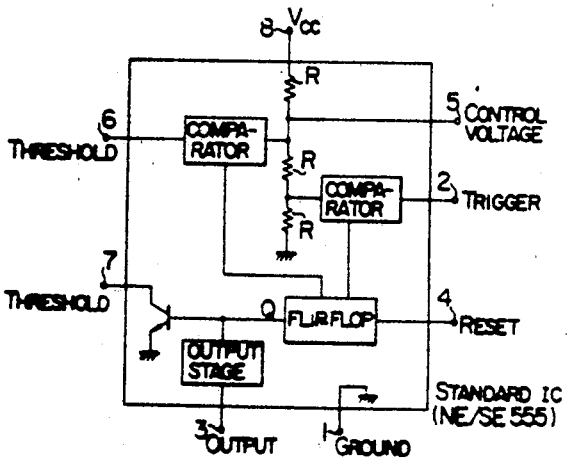
FIG. 3b shows an internal configuration of the above integrated circuit NE/SE 555.

FIG. 3b shows the internal configuration of the element 16 in FIG. 3a, and it corresponds to a standard timer IC 555 (Integrated Circuit).

Figure 4A:
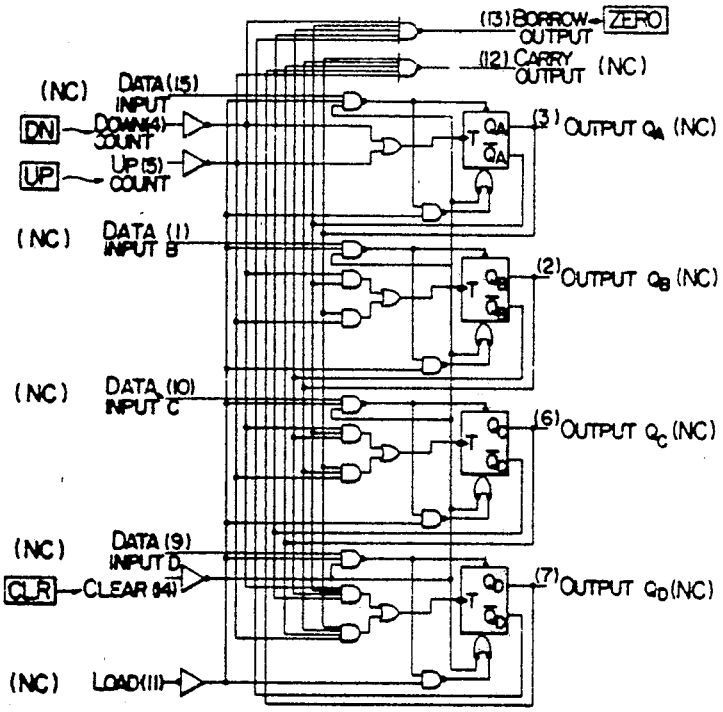
FIG. 4a shows a particular circuit diagram in which the functions of a counter 7 and a decoder 8 in the embodiment of FIG. 2b are combined.

FIG. 4a shows a particular circuit wherein the functions of the counter 7 and the decoder 8 in the embodiment of FIG. 2b are combined. It is realized by a standard MSI (binary up/down counter) 74193. The decoder produces an output when the contact of the counter is all "0". NC in FIG. 4a designates non-connected terminal.

Figure 4B:
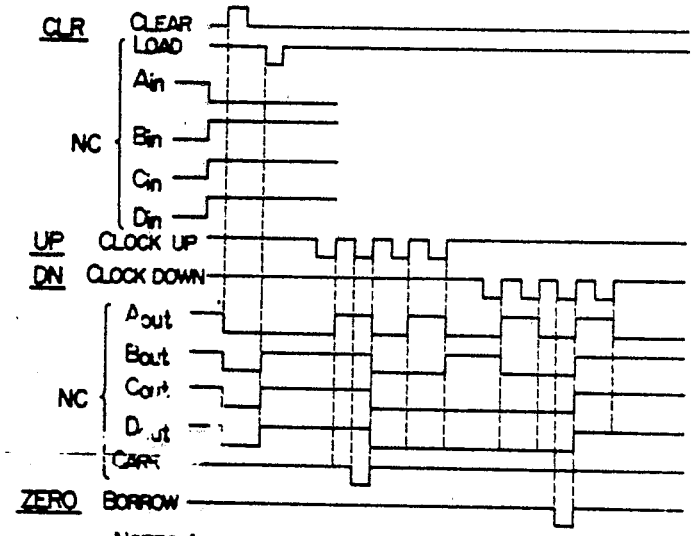
FIG. 4b shows a timing chart for a standard MSI/74193.

FIG. 4b shows a timing chart for the standard MSI/74193.

Figure 5:
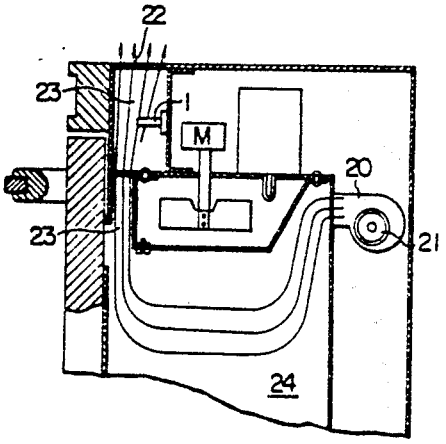
FIG. 5 is a cross-sectional view of a microwave oven in which cooling air flow together with a humidity sensor are shown.

Referring to FIG. 5 which shows a cross-section of a microwave oven, a fan 20 driven by a motor 21 is used to supply cooling air flow forcibly and also to cause the air flow to be exhausted from an exhaust port 22 through a heating cavity 24 along an air-flow path 23.

The humidity sensor 1 is located, for example, down stream of the air-flow path 23. Alternatively, cooling air flow which is also used to cool a magnetron and other electrical devices may be utilized.

What is claimed is:

1. A heating time control apparatus for use in a microwave oven having a heating cavity, heating means for heating food-stuff in said heating cavity, and air blowing means for blowing air into said heating cavity, said heating time control apparatus comprising:

humidity sensing means located in the path of air blown by said air blowing means, comparison means connected to said humidity sensing means for comparing the sensed humidity with a predetermined humidity level and for generating a signal when the sensed humidity reaches said predetermined level, heating time determining means for determining the total heating time consisting of first and second heating time periods for said food-stuff, said first time period being measured from the application of power to said heating means until the signal from said comparison means is received and said second time period corresponding to the product of a heating time coefficient and said first time period, said heating time coefficient being predetermined depending on the type of food-stuff, and heating control means for controlling the supply of power to said heating means in response to a signal from said heating time determining means.

2. A heating time control apparatus according to claim 1, wherein said predetermined humidity level corresponds to the humidity at an abrupt humidity gradient.

3. A heating time control apparatus according to claim 1 wherein said humidity sensing means senses the humidity which varies with the heating of said food-stuff, and wherein said heating time determining means comprises a first signal generator for generating a train of reference clock pulses having a first period, a second signal generator for generating a train of clock pulses having a second period depending on the type of food-stuff, a counter circuit for serially counting up the clock pulses generated by said first signal generator until the sensed humidity reaches said predetermined humidity level thereby measuring said first heating time period and thereafter serially counting down the clock pulses generated by said second signal generator thereby measuring said second heating time period, and a decoder circuit for producing an output signal when the content of said counter circuit during the count-down operation reaches a predetermined value, the output signal of said decoder circuit being supplied to said heating control means to stop the supply of power to said heating means.

4. A heating time control apparatus according to claim 3, wherein said second signal generator includes a pulse generator circuit and a plurality of parallel circuits each having a resistor and a switch associated therewith, the pulse period of said train of clock pulses generated by said pulse generator circuit being determined by selecting one of said plurality of parallel resistors by means of a switch corresponding to the type of food-stuff.

5. A heating time control apparatus according to claim 1 wherein said humidity sensing means is made of titanium oxide ceramic.

*6. A heating time control apparatus for use in a microwave oven having a heating cavity, heating means for heating a food-stuff in said heating cavity, and air blowing means for blowing air into said heating cavity, said heating time control apparatus comprising:*

*vapor sensing means located in the path of air blown by said air blowing means for sensing a vapor generated from said food-stuff, the level of which significantly increases at a particular temperature during heating of said food-stuff,*

*comparison means connected to said vapor sensing means for comparing the sensed amount of vapor with a predetermined vapor level value and for generating a signal when the sensed amount of vapor reaches said predetermined level,*

*heat time determining means for determining the total heating time consisting of first and second heating time periods for said food-stuff, said first time period being measured from the application of power to said heating means until the signal from said comparison means is received and said second time period corresponding to the product of a heating time coefficient and said first time period, said heating time coefficient being predetermined depending on the type of food-stuff, and*

*heat control means for controlling the supply of power to said heating means in response to a signal from said heating time determining means.*

* * * * *